United States Patent [19]

Nowak

[11] Patent Number: 4,932,627
[45] Date of Patent: Jun. 12, 1990

[54] CLEVIS OR OTHER MOUNT FOR A MECHANICAL BRAKE ASSEMBLY OR THE LIKE

[76] Inventor: Florian I. Nowak, 16 Dean Dr., Newington, Conn. 06111

[21] Appl. No.: 309,149

[22] Filed: Feb. 13, 1989

Related U.S. Application Data

[60] Division of Ser. No. 220,451, Jul. 18, 1988, Pat. No. 4,834,220, which is a continuation-in-part of Ser. No. 91,092, Aug. 31, 1987, Pat. No. 4,778,036.

[51] Int. Cl.⁵ .............................................. F16M 3/00
[52] U.S. Cl. ..................................... 248/674; 188/85; 192/80; 248/681
[58] Field of Search ...................... 188/82.6, 77 R, 85, 188/83; 192/80; 248/674, 676, 678, 304, 305, 681; 410/77, 80

[56] References Cited

U.S. PATENT DOCUMENTS

| 1,063,716 | 6/1913 | McLaughlin | 248/681 |
| 1,252,810 | 1/1918 | Kirchner | 410/77 |
| 1,876,464 | 9/1932 | Miller | 248/305 |
| 2,147,939 | 2/1939 | Tishken | 188/85 X |
| 2,427,603 | 9/1947 | Higgins | 410/80 |
| 3,036,668 | 5/1962 | Falk et al. | 188/77 R |
| 3,756,354 | 9/1973 | Clark | 188/77 R |
| 4,168,768 | 9/1979 | Johnson et al. | 188/77 R X |
| 4,417,712 | 11/1983 | DeHart | 248/304 X |
| 4,420,885 | 12/1983 | Todero | 188/77 R X |
| 4,601,378 | 7/1986 | Pierce et al. | 248/674 X |
| 4,778,036 | 10/1988 | Nowak | 188/77 R X |
| 4,834,220 | 5/1989 | Nowak | 188/85 |

Primary Examiner—Ramon O. Ramirez
Attorney, Agent, or Firm—Ira S. Dorman

[57] ABSTRACT

A free-floating mount for mechanical parts has a finger portion for cooperatively engaging structure of a machine incorporating the mount, to limit its displacement and rotation. The mount is especially designed for use in an assembly by which braking force is intermittently applied to and relieved from a rotating machine member.

9 Claims, 4 Drawing Sheets

CLEVIS OR OTHER MOUNT FOR A MECHANICAL BRAKE ASSEMBLY OR THE LIKE

CROSS-REFERENCE TO RELATED APPLICATION

This is a divisional of co-pending application Ser. No. 220,451, filed on 7/18/88, now U.S. Pat. No. 4,834,220, which application is a continuation-in-part of copending application Ser. No. 07/091,092, filed August 31, 1987; now U.S. Pat. No. 4,778,036.

BACKGROUND OF THE INVENTION

It is common practice to provide means for applying a retarding force to a shaft or other rotating part of a machine, to compensate for looseness caused by wear. Such slack in the power transmission system tends to create "chatter", and to produce inaccuracy when machining operatives are involved. In some instances, for example, as much as two degrees of backlash can result from gear train wear when the working load upon tooling is relieved, and the attendant problems may be particularly acute in those instances in which small tools, which must be handled with considerable delicacy, are involved. Although many different forms of machines suffer from difficulties of this nature, those in which constant and frequent indexing occurs, such as in automatic screw machines, represent specific instances in which it is particularly important to damp spurious movement caused by wear.

As indicated, this has been accomplished in the past by creating a drag upon a shaft of the machine, developed by frictional force that is applied either continuously or intermittently. The former approach is disadvantageous for a number of reasons, including the need that it creates for overpowering of the machine, so as to ensure the availability of sufficient net energy for providing the desired speed and other characteristics of operation; also, there is of course a substantial waste of energy and the generation of excessive amounts of heat.

Other forms of devices apply the retarding force only during the working phase of the cycle, relieving it when indexing is to occur. While offering obvious advantages over constant-drag arrangements, the prior art systems of this type have typically relied upon springs or hydraulic and pneumatic means to effect the dynamic action required; furthermore, they have not been entirely satisfactory in operation, and they have tended to be overly complex and prone to premature failure.

The foregoing and other deficiencies of the prior art devices have been at least substantially overcome in the brake assembly and related subject matter of the above-identified copending application. As described therein, however, the "floating" clevis is provided with a pin which is so disposed as to engage a structural part of the machine, to thereby prevent inadvertent disassembly when the machine is backed up. It has been found that such a manner of inter-engagement tends to rotate the clevis about the axis of the actuating arm, thereby causing a tightening force to be exerted upon the brake band. The force developed often makes manual reversal of the machine quite difficult, and can in fact be of such magnitude as to virtually arrest reversal.

Accordingly, it is the broad object of the present invention to provide a novel mount, usually in the form of a clevis, having a hooking portion for engaging a stationary member to prevent disassembly upon reverse action of the machine in which it is installed, without however imposing undue restraint upon movement of the machine components.

Related objects are to provide a novel mechanical brake assembly, and a novel machine combination, in which the mount is incorporated.

Another object is to provide such a mount which is of relatively uncomplicated and inexpensive construction, and which is nevertheless highly effective for its intended purposes.

SUMMARY OF THE INVENTION

It has now been found that certain of the foregoing and related objects of the invention are readily attained by the provision of a mount for mechanical parts, comprised of a body portion and a hooking portion. The body portion of the mount has means for mounting at least one part thereon, and it has a base element, normally at the bottom, adapted for abutment against a support member. The hooking portion extends from, and forms a recess with, the body portion; it is adapted to engage a stationary element inserted into the recess, to limit movement of the mount away from the support member.

In the preferred embodiments the mounting means will mount a first part for pivotable movement about a first axis, spaced upwardly from the base element and extending transversely through the body portion, and will mount a second part on a second transverse axis spaced above the first. The hooking portion will comprise a finger joined to the body portion and extending upwardly therealong, and will provide a surface, partially defining the recess, which extends at a downwardly convergent acute angle to the plane in which the above-mentioned axes are included.

The mounting means may, more particularly, comprise at least one arcuate indentation formed into an upper margin of the body portion, for mounting the second part, and at least one circular aperture formed into the body portion for mounting the first part. Generally, the mount will be of one-piece, integrally formed, unitary construction. It will most desirably be in the form of a clevis in which the body portion includes a base component and a pair of upstanding, transversely spaced legs, with the hooking portion being a finger component attached to the base component and having a downwardly sloping, recess-defining surface thereon.

Other objects are attained by the provision of a mechanical brake assembly including a clevis having the above-mentioned features, a brake band, an actuating member, and a connector. The transversely spaced legs of the clevis will have means for pivotably mounting the actuating member on an axis spaced upwardly from the base component thereof, and for mounting the brake band on a further upwardly spaced axis, and the connector, by which the actuating member is operatively connected to the brake band, will be disposed in the space between the legs.

Additional objects are attained in a machine having a bed with a supporting surface, structure providing a stationary element spaced from the supporting surface, and a member that is rotatable in forward and rearward directions; in combination with an assembly which includes a mount of the above-described construction. The mount is freely seated upon the machine bed, with a base element thereof abutted against its supporting surface, and at least one part mounted thereon is operatively connected to the rotatable member of the machine so as to be subject to the rotational forces thereof.

Such force, transmitted by the mounted part, will urge the mount against the supporting surface in the forward direction of rotation, and will displace it therefrom in the rearward direction; the hooking portion will serve to limit such displacement by engagement with the stationary element of the machine structure.

Generally, the "one" mounted part of the machine combination will be a brake band that is operatively connected for the application of a retarding force to the rotatable member. An actuating member will also be mounted on the mount, and will be operatively connected for the receipt of actuating force from the rotatable member, and for the transmission thereof to the brake band, thereby automatically enabling the intermittent application of retarding force to the rotatable member. The restraint of the mount, achieved by engagement of its hooking portion with the stationary element of the machine, will prevent the imposition of excessive retarding force upon the rotatable member as it turns in the reverse direction.

DETAILED DESCRIPTION OF THE ILLUSTRATED EMBODIMENTS

Figure 1:
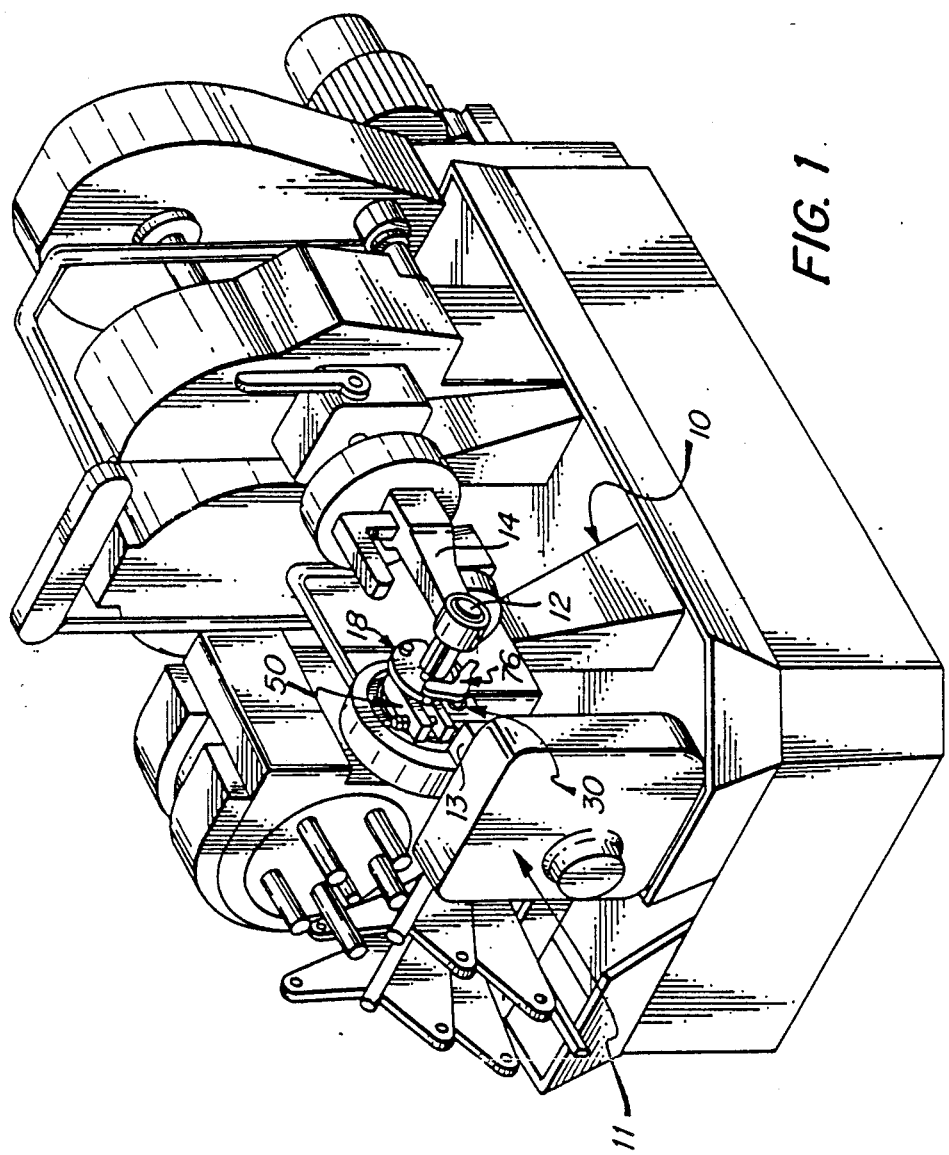
FIG. 1 is a perspective, somewhat schematic view of an automatic screw machine in which a mechanical brake assembly embodying the invention is installed.
Figure 2:
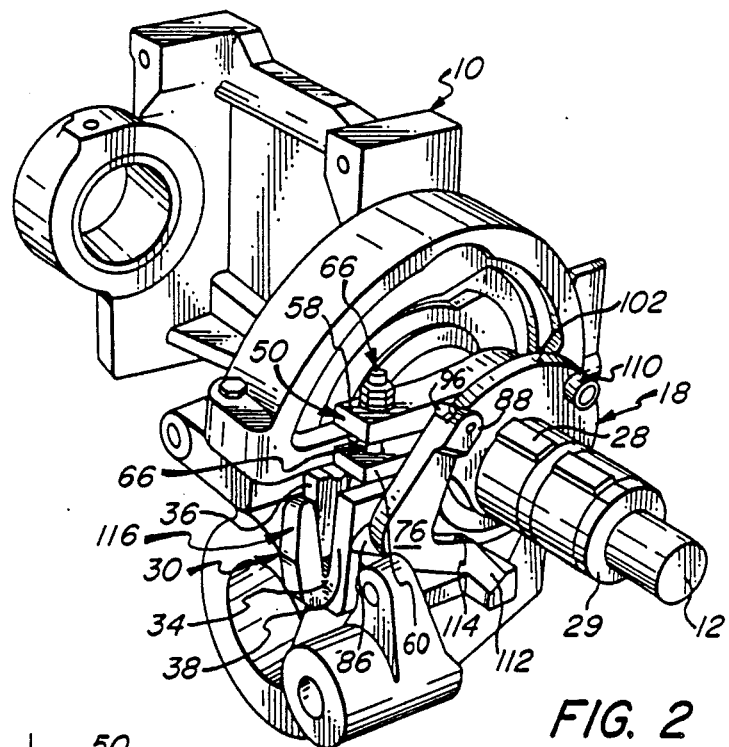
FIG. 2 is a perspective view of the assembly installed on the tool spindle cam shaft of the machine of FIG. 1, drawn to a scale enlarged therefrom.
Figure 3:
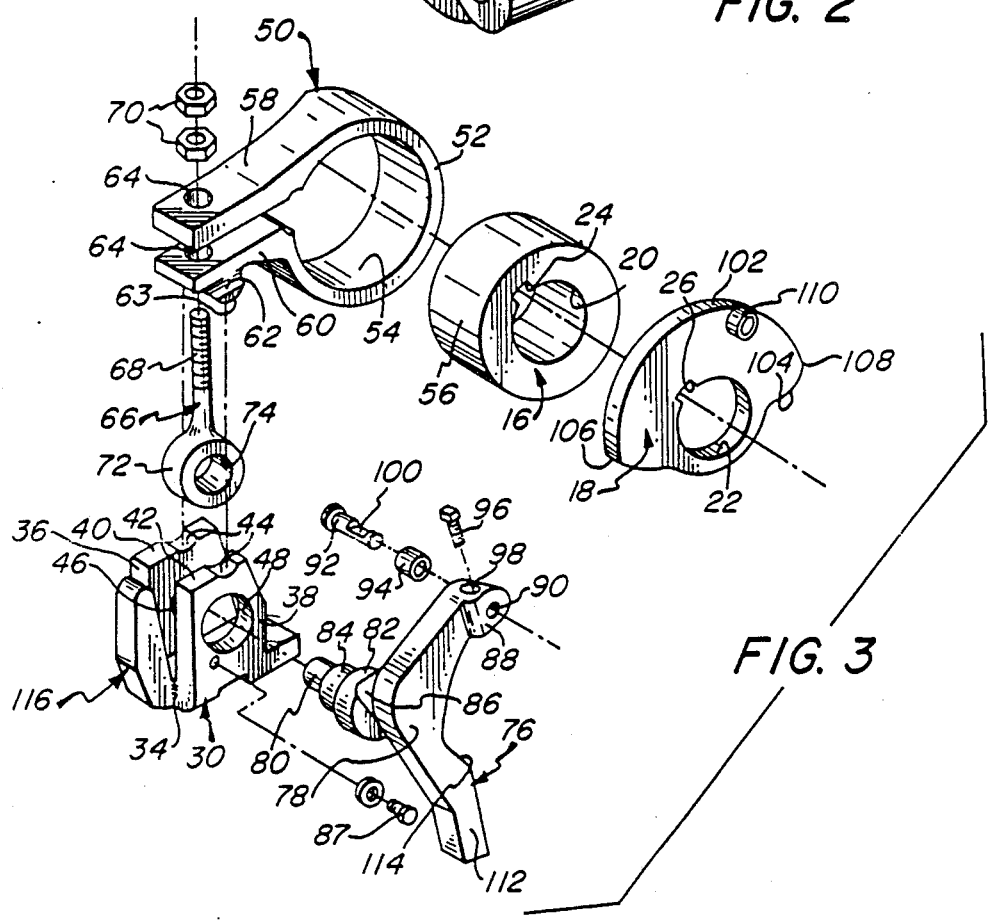
FIG. 3 is an exploded perspective view showing the components of which the assembly is constituted.

Turning now in detail to the appended drawings, FIG. 1 depicts the assembly of the invention installed in a schematically illustrated five-spindle automatic screw machine, for which application it is particularly well-adapted; such machines are commercially available from Davenport Machine Tool Co., Inc. of Rochester, New York. The frame section of the screw machine in which the device in installed is shown in some detail in FIG. 2, and is generally designated by the numeral 10; it supports the tool spindle cam shaft 12, the outer end of which is journalled within an arm portion 14 of the frame (as seen in FIG. 1). A gearbox, generally designated by the numeral 11, is located adjacent the spindle area, and the housing thereof has a projecting portion 13.

The rotating components of the brake assembly are mounted upon the cam shaft 12, and consist of a cylindrical brake drum, generally designated by the numeral 16, and a cam plate, generally designated by the numeral 18. The brake drum and cam plate have circular openings 20, 22, respectively, extending axially through them, along which are formed axial keyways 24, 26. The openings 20, 22 serve of course to permit mounting of the components upon the shaft 12, and the keyways 24, 26 receive the cam shaft key 28, which locks them in fixed angular positions thereupon; retaining ring 29 serves to maintain the parts against axial disassembly from the shaft.

A U-shaped bracket or clevis, generally designated by the numeral 30, is supported upon the upper surface 15 of the bed 17 of the frame 10. In cooperation therewith, the surrounding frame structure maintains the clevis 30 in position during forward operation of the machine, even though it is free to "float" thereon. The upstanding flange portions, or legs, 36, 38 of the clevis 30 provide shoulders 40, 42, into which indentations 44 are formed. A relatively small circular opening 46 extends through the flange portion 36, and a relatively large opening 48 extends through the flange portion 38 in alignment therewith.

Although not illustrated in detail, it has been found desirable to provide structure which reduces surface contact along the bottom of the clevis. It has also been found to be desirable to indent the central part of the clevis base, as at 31, to provide clearance for any irregularities that may be present on the bed surface 15 and to ensure proper seating of the clevis.

The brake band, generally designated by the numeral 50, includes a cylindrical, split-ring portion 52, which encircles the brake drum 16 with its inner surface 54 closely confronting the surface 56 of the drum; the surfaces 54, 56 are of substantially the same axial dimension, so as to maximize the contact area between them. An upper arm portion 58 extends tangentially from one of the free ends of the split-ring portion 52, and a lower arm portion 60 extends generally parallel to it from the other free end. A rib formation 62, of generally semicircular cross section, extends across the bottom of the lower arm portion 60; its curved surface 63 seats within the semicircular indentations 44 on the shoulders 40, 42 of the clevis 30, to permit limited rocking movement of the brake band 50.

The arm portions 58, 60 have aligned apertures 64 extending through their free ends, which serve to receive the threaded shank portion 68 of an eyebolt connector, generally designated by the numeral 66. The connector 66 is retained against downward disassembly by the two nuts 70, which are threadably engaged upon its shaft portion 68. The circular head portion 72 of the connector 66 is disposed within the space between the upstanding flange portions 36, 38 of the clevis 30, and is positioned with its circular opening 74 in alignment with the openings 46, 48 thereof.

The clevis 30 also serves to pivotably mount an actuating arm, generally designated by the numeral 76. For this purpose, the central portion 78 of the arm 76 has a compound lug structure extending laterally from it, which consists of an outer, relatively small cylindrical element 80, an inner, relatively large cylindrical element 82, and an element 84 of intermediate diameter therebetween; the elements 80 and 82 are coaxial, whereas the intermediate element 84 is eccentrically disposed with respect to the axis between them. The outside diameters of elements 80, 82 and 84 are substantially the same as the diameters of the openings 46, 48 and 74, respectively; thus, the arm 76 is pivotably supported by the clevis 30, with the eccentric element 84 rotatably engaging the head portion 72 of the connector 66. The flange 86 on the arm bears upon the surface surrounding the opening 48, and the head of the screw 87 (engaged in the side of the clevis) bears upon the face of the element 82, to prevent inadvertent disassembly.

The actuating arm 76 has a slightly enlarged head portion 88 at its upper end, through which extends a transverse bore 90. A headed pin 92 is inserted into the bore 90, and through the passage of a small cylindrical roller 94; it is retained within the head portion 88 by a screw 96, which is threaded into aperture 98, perpendicular to the bore 90, with its lower end engaged within the small slot 100 formed into the surface of the shank of the pin 92, to securely but removably mount the roller 94 upon the actuating arm 76.

With the arm 76 mounted upon the support bracket 30, the roller 94 is disposed in the transaxial plane of the cam plate 18 and is positioned to ride upon the circumferential edge thereof. The latter provides a camming surface comprised of a maximum dimension constant radius portion 102, a reduced radii portion 104 of varying curvature, and lobes 106, 108 at the points of transition between the portions 102 and 104. The cam plate 18 also has a roller 110 projecting axially from one face, which is disposed to engage the substantially planar surface 114 adjacent the tail portion 112 of the actuating arm 76.

Figure 4:
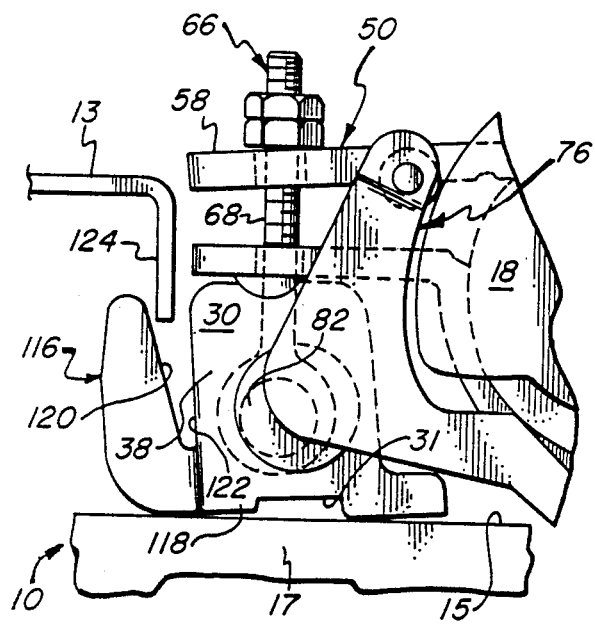
FIG. 4 is an elevational view showing the actuating arm of the assembly pivoted by the cam plate on the machine shaft to deflect the brake band member, so as to apply frictional force to the brake drum member, with the clevis of the assembly urged against the supporting surface of the machine bed on which it is seated.
Figure 5:
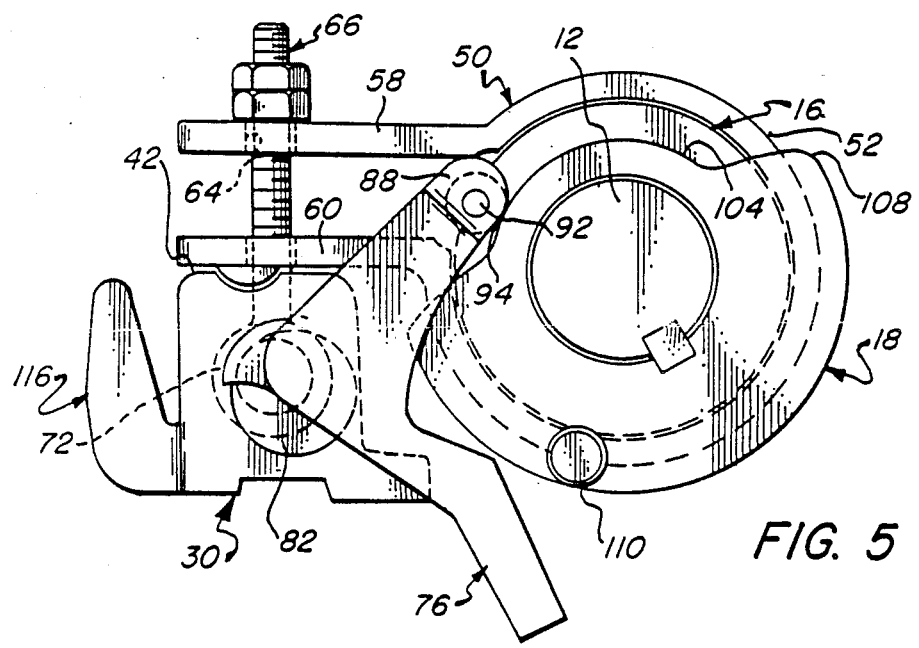
FIG. 5 is a view similar to FIG. 4, showing the cam plate rotated so as to shift the arm to a position at which force upon the brake band member is relieved.
Figure 6:
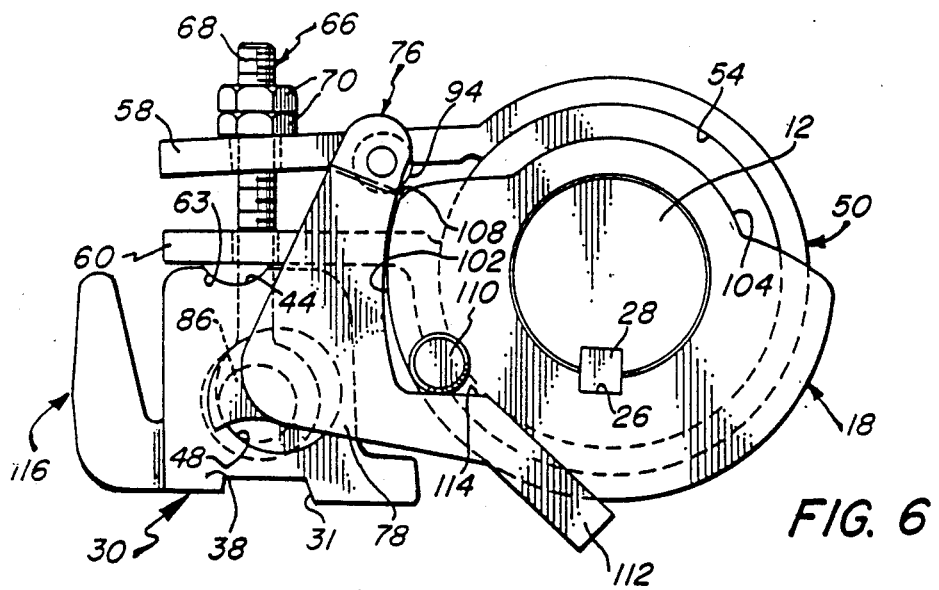
FIG. 6 is a view similar to FIGS. 4 and 5 showing the cam plate rotated so as to position the cam follower of the actuating arm at the point of transition between the portions of the camming surface, also showing the return cam element on the plate entering the cooperating cam surface on the arm.
Figure 8:
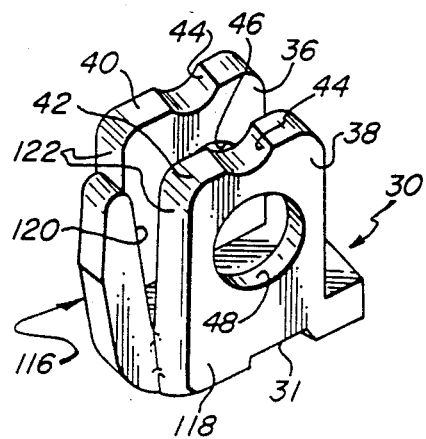
FIG. 8 is a perspective view of a clevis embodying the present invention.

Operation of the brake is most readily understood with reference to FIGS. 4-6. In FIG. 4, the tool spindle cam shaft 12 is at an angular orientation in which the actuating arm 76 is pivoted to its extreme counterclockwise position (as viewed in the Figure), due to contact of the follower roller 94 upon the constant radius portion 102 of the camming plate 18. The eccentric relationship of the intermediate lug element 84 to the axis of pivoting of the arm 76 causes it to exert a downward force upon the eyebolt 66, acting on the upper arm portion 58 of the brake band 50 to squeeze it toward the restrained arm portion 60, thus bringing the inner surface 54 of the split-ring portion 52 into tight frictional engagement with the outer surface 56 of the brake drum 16, and in turn producing a retarding effect upon the tool spindle cam shaft 12. The angular position and length of the camming surface portion 102 will normally be such as to time the application and release of braking force to commence just ahead of the working phase of the machine operating cycle, and to continue therethrough and for a short period thereafter.

As shown in FIG. 5, the shaft 12 has been rotated to a position in which the follower roller 94 rides on the reduced radii portion 104 of the cam plate periphery, thereby permitting the actuating arm 76 to pivot in a clockwise direction, thus elevating the eyebolt 66 and relieving the force upon the brake band upper arm portion 58. This in turn creates sufficient spacing between the confronting surfaces 54, 56 to remove the drag force, and in normal operation of the timing would be such as to cause this condition to exist during indexing phases of machine operation.

In FIG. 6, the follower roller 94 is positioned over the cam lobe 108, just prior to its descent to the camming surface portion 104, and the return follower roller 110 has engaged the planar surface 114 in the actuating arm 76. Consequently, as the cam profile of the plate 18 allows pivoting of the actuating arm 76 to the force-relieving relationship, the return roller 110 shifts the arm to that position as the cam plate continues to rotate. This of course positively ensures that the braking effect upon the machine transmission gearing will be relieved, without reliance upon springs or other auxiliary means for effecting the return of the arm.

The clevis 30 has finger portion, generally designated by the numeral 116, projecting laterally and upwardly from the base component 118, intermediate the flange portions 36, 38 thereof. The downwardly sloping inside surface 120 of the finger portion 116 is generally rectilinear, and converges at an acute angle to the imaginary transverse vertical plane of the clevis, as taken generally through the axes of the indentations 44 and the circular apertures 46, 48; the surface 120 defines a generally V-shaped recess in cooperation with the adjacent lateral surfaces 122 of the flange portions 36, 38.

Figure 7:
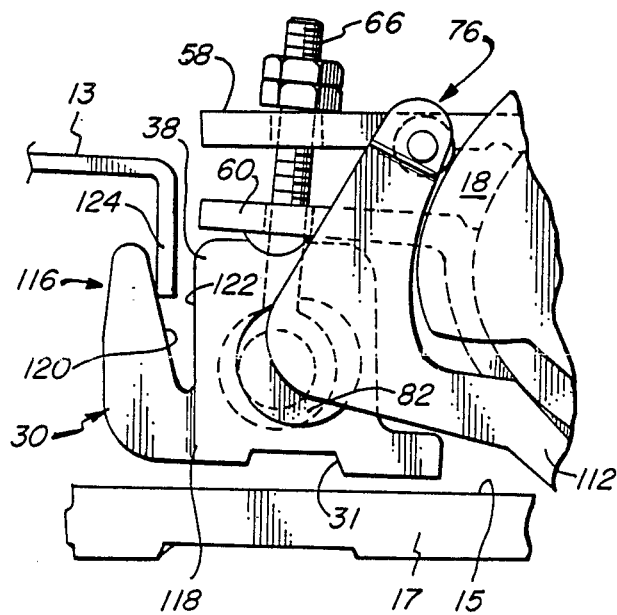
FIG. 7 is another similar view showing the assembly lifted from the machine bed by reverse rotation of the machine shaft, and showing the hooking finger of the clevis engaged under a flange portion of the gearbox housing.

As seen in FIGS. 4 and 7, the projecting portion 13 of the gearbox housing has a downturned flange element 124 thereon, which is aligned with the V-shaped recess of the clevis 30. In the normal position of the clevis, seated on the machine bed 17 (i.e., when the machine is idle, or when it is operating forwardly), as shown in FIG. 4, the flange element 124 is out of contact with the finger portion 116, leaving the clevis free to move away from its seat. When however the machine is reversed (as is done by use of a hand wheel in a conventional screw machine, for example), the frictional engagement of the brake band 50 on the drum 16 causes the clevis 30 to lift away from its supporting surface, bringing the finger portion 116 into engagement with the flange element 124 of the housing, as shown in FIG. 7.

Not only does the stationary structure of the machine thereby serve to prevent excessive vertical displacement (and ultimately disassembly) of the brake assembly, but it also restrains lateral inward movement of the clevis 30 and prevents it from rotating on the axis of the cylindrical elements 80, 82 of the actuating arm 76, as would tend to occur (in a counterclockwise direction, as depicted in the several figures) if only a vertical constraint were imposed. Such rotation would cause the connecting eyebolt 66 to squeeze the brake band arms 58, 60 together, in turn tending to increase the resistance to shaft rotation and thereby making the backing-up operation most difficult to complete.

It will be noted that the tail portion 112 of the arm 76 is of sufficient length to extend beyond the path circumscribed by the roller 110. Were it too short, the roller 110 might pass behind the arm 76 rather than in front of it when the machine is backed up, which would of course present a risk of serious damage to the machine and harm to personnel.

It will be self-evident to those skilled in the art that the components of the assembly of the invention will normally be made of suitable metals, the choice of which will be apparent. Depending upon the particular application for which the device is intended, however, the materials of construction may vary, as may the specific form of the mount, and of the other components of which the assembly is comprised. Finally, the hooking portion of the mount may have any of a wide variety of different configurations, and may of course be adapted to engage parts other than the structural element hereinabove described.

Thus, it can be seen that the present invention provides a novel mount for a machine, usually in the form of a clevis, having a hooking or functionally equivalent portion for engaging a stationary member upon reversal of the machine in which it is installed. The invention also provides a novel mechanical brake assembly, and a novel machine combination, in which the mount is incorporated; the mount is of relatively uncomplicated and inexpensive construction, and is yet highly effective for its intended purposes.

What is claimed is:

1. A mount for mechanical parts, comprised of a body portion having means for mounting at least one part thereon, and having a base element adapted for abutment against an underlying support member, said base element being at the bottom of said body portion and said mounting means being disposed vertically thereabove, with said base element abutted against such a support member; and a hooking portion comprising a finger joined to and extending upwardly along said body portion and forming a recess therewith opening in a generally upward direction said finger being adapted to receive and engage a stationary element inserted into said recess to limit upward movement of said mount away from the support member.

2. The mount of claim 1 wherein said mounting means is adapted to mount a first part for pivotable movement about a first axis spaced upwardly from said base element and extending transversely through said body portion, and to mount a second part on a second transverse axis spaced above said first axis; and wherein said finges provides a surface, defining said recess, which extends at a downwardly convergent acute angle to the plane in which said axes are included.

3. The mount of claim 1 wherein said mount is of one-piece, integrally formed, unitary construction.

4. The mount of claim 1 wherein said mounting means comprises at least one arcuate indentation formed into an upper margin of said body portion, for mounting the second part.

5. The mount of claim 4 wherein said mounting means comprises at least one circular aperture formed into said body portion, for mounting the first part.

6. The mount of claim 2 wherein said mount is in the form of a clevis, said body portion including a base component having said base element thereon and a pair of transversely spaced leg components extending therefrom, said finger extending from said base component in the same general direction as said leg components.

7. A clevis for mounting parts of a mechanical brake assembly, comprising: a body portion, including a base component at the bottom thereof having an element thereon adapted for abutment against an underlying support member, and a pair of upstanding, transversely spaced legs having mounting means for pivotably mounting a first part of the assembly on a first transverse axis spaced upwardly of said base component, and for mounting a second part on a second, further upwardly spaced transverse axis; and a hooking portion in the form of an upstanding finger component attached to said base component and forming an upwardly opening recess with said body portion adapted to receive and engage a stationary element inserted thereinto, to thereby limit upward movement of said clevis, said finger component having a recess-defining surface which extends at a downwardly convergent acute angle to the plane in which said axes are included.

8. The clevis of claim 7 wherein said mounting means comprises transversely aligned circular apertures in said legs, for mounting the first part, and transversely aligned arcuate indentations formed into upper margins of said legs, for mounting the second part.

9. The clevis of claim 7 wherein said clevis is of one-piece, integrally formed, unitary construction.

* * * * *